(12) United States Patent
Faith

(10) Patent No.: US 10,437,918 B1
(45) Date of Patent: Oct. 8, 2019

(54) PROGRESSIVE IMAGE RENDERING USING PAN AND ZOOM

(71) Applicant: GOOGLE INC., Mountain View, CA (US)

(72) Inventor: Joseph Emmanuel Faith, Newcastle (GB)

(73) Assignee: GOOGLE LLC, Mountain View, CA (US)

( * ) Notice: Subject to any disclaimer, the term of this patent is extended or adjusted under 35 U.S.C. 154(b) by 250 days.

(21) Appl. No.: 14/877,867

(22) Filed: Oct. 7, 2015

(51) Int. Cl.
 *H04N 19/10* (2014.01)
 *G06F 17/22* (2006.01)
 *H04L 29/08* (2006.01)
 *H04N 19/517* (2014.01)

(52) U.S. Cl.
 CPC ...... *G06F 17/2252* (2013.01); *G06F 17/2247* (2013.01); *H04L 67/02* (2013.01); *H04L 67/32* (2013.01); *H04N 19/10* (2014.11); *H04N 19/517* (2014.11)

(58) Field of Classification Search
 CPC .. G06F 9/4443; G06F 15/16; G06F 17/30899; G06F 17/2247; H04L 67/02; H04L 67/2828; H04N 19/10; H04N 19/517
 See application file for complete search history.

(56) References Cited

U.S. PATENT DOCUMENTS

| | | | |
|---|---|---|---|
| 6,366,294 B1 | 4/2002 | Cunningham et al. | |
| 6,453,073 B2 * | 9/2002 | Johnson | H04N 19/30 369/124.06 |
| 6,570,510 B2 * | 5/2003 | Chen | H04N 19/645 341/51 |
| 6,683,980 B1 * | 1/2004 | Meier | H03M 7/40 341/67 |
| 6,747,648 B2 * | 6/2004 | Hoehn | G06T 11/60 345/428 |
| 6,944,357 B2 * | 9/2005 | Bossut | G06T 9/00 382/232 |
| 7,075,535 B2 | 7/2006 | Aguera et al. | |
| 7,299,300 B2 * | 11/2007 | Desai | H04L 47/10 370/477 |
| 7,554,543 B2 * | 6/2009 | Aguera Y Arcas | G06F 3/0481 345/428 |
| 7,827,488 B2 * | 11/2010 | Sitrick | G09G 5/377 715/716 |

(Continued)

*Primary Examiner* — Maikhanh Nguyen
(74) *Attorney, Agent, or Firm* — Brake Hughes Bellermann LLP

(57) ABSTRACT

A server device includes a memory and a processor. The memory can include an image and code representing a webpage including the image. The processor can be configured to select a portion of the image based on resources associated with encoding the image and based on resources associated with communicating the webpage to a user device, encode the selected portion of the, transmit the webpage, the encoded portion of the image and an indication that the webpage includes the portion of the image to the user device, encode the at least one image, and transmit the encoded image and an indication that the encoded image corresponds to the portion of the image. The user device can render the webpage, including the portion of the image, on a display, receive the image, and replace the portion of the image with the image using a zoom out rendering technique.

20 Claims, 8 Drawing Sheets

(56) References Cited

U.S. PATENT DOCUMENTS

| | | | |
|---|---|---|---|
| 8,194,102 B2 | 6/2012 | Cohen et al. | |
| 8,224,098 B2 | 7/2012 | Adabala et al. | |
| 8,274,571 B2* | 9/2012 | Zhu | H04N 1/00204 348/211.2 |
| 8,279,456 B2 | 10/2012 | King et al. | |
| 8,307,279 B1 | 11/2012 | Fioravanti et al. | |
| 8,370,342 B1* | 2/2013 | Li | G06F 16/9577 707/728 |
| 8,384,952 B2* | 2/2013 | Hayasaki | H04N 1/644 345/555 |
| 8,515,193 B1* | 8/2013 | Han | H04N 19/30 382/238 |
| 8,533,628 B2 | 9/2013 | Rohrabaugh | |
| 8,782,551 B1* | 7/2014 | Bartelma | G06F 3/0483 715/776 |
| 8,824,794 B1* | 9/2014 | Nash | G06T 3/4053 382/167 |
| 9,015,857 B2* | 4/2015 | Sprague | G06F 21/60 726/26 |
| 9,197,864 B1* | 11/2015 | Starner | H04N 5/23222 |
| 9,466,112 B1* | 10/2016 | Starner | H04N 5/23222 |
| 9,554,060 B2* | 1/2017 | Filip | H04N 5/23238 |
| 9,565,229 B2* | 2/2017 | Clark | H04L 65/602 |
| 9,852,506 B1* | 12/2017 | Starner | H04N 5/23222 |
| 2005/0188112 A1* | 8/2005 | Desai | H04L 47/10 709/247 |
| 2007/0162842 A1* | 7/2007 | Ambachtsheer | G06F 17/211 715/205 |
| 2007/0176796 A1* | 8/2007 | Bliss | G01C 21/367 340/995.14 |
| 2008/0037880 A1* | 2/2008 | Lai | H04N 19/172 382/232 |
| 2008/0231643 A1 | 9/2008 | Fletcher et al. | |
| 2009/0022357 A1 | 1/2009 | Katz et al. | |
| 2009/0089448 A1* | 4/2009 | Sze | G06F 9/4443 709/231 |
| 2009/0303253 A1* | 12/2009 | Flake | G06F 17/30899 345/660 |
| 2010/0295971 A1* | 11/2010 | Zhu | H04N 1/00204 348/240.99 |
| 2012/0159376 A1* | 6/2012 | Crow | G06F 3/04845 715/780 |
| 2012/0201475 A1* | 8/2012 | Carmel | H04N 19/172 382/238 |
| 2012/0212668 A1 | 8/2012 | Schultz et al. | |
| 2012/0300837 A1* | 11/2012 | Wilkins | H04N 19/513 375/240.12 |
| 2012/0306930 A1 | 12/2012 | Decker et al. | |
| 2013/0016778 A1* | 1/2013 | Ameres | H04N 19/147 375/240.12 |
| 2013/0208012 A1 | 8/2013 | Ergan et al. | |
| 2013/0275422 A1* | 10/2013 | Silber | G06F 16/24578 707/728 |
| 2014/0240553 A1 | 8/2014 | Pylvanainen et al. | |
| 2014/0372568 A1* | 12/2014 | Clark | H04L 65/602 709/219 |
| 2015/0070373 A1* | 3/2015 | Clinton | G06F 17/214 345/589 |
| 2015/0213577 A1* | 7/2015 | Filip | H04N 5/23238 345/671 |

* cited by examiner

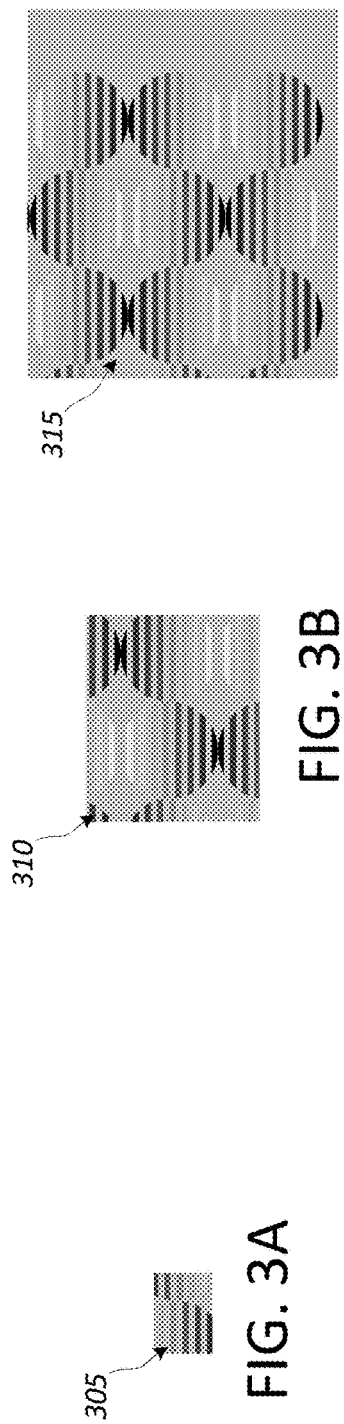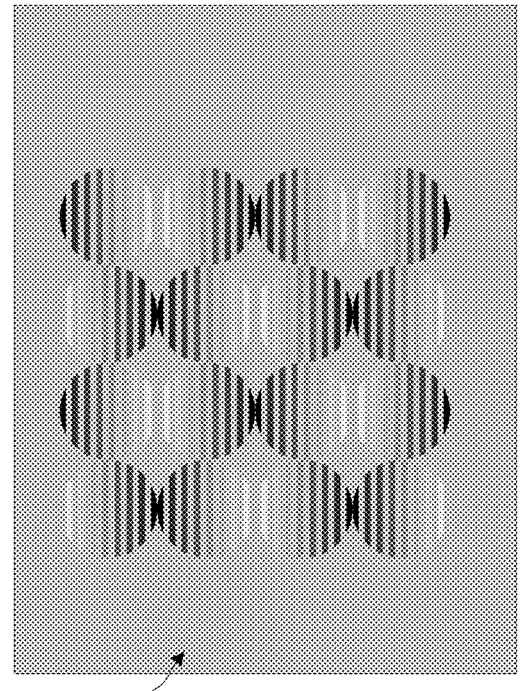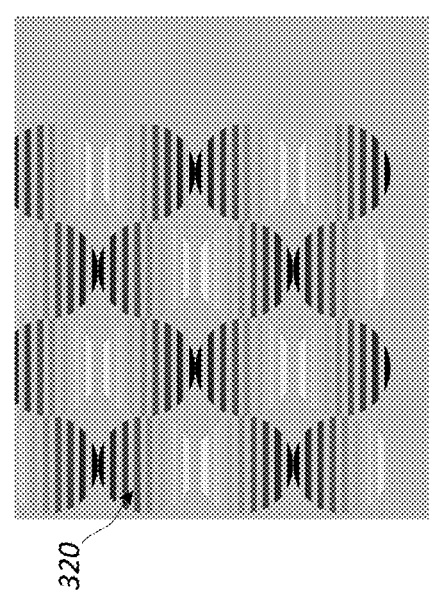

PROGRESSIVE IMAGE RENDERING USING PAN AND ZOOM

FIELD

Embodiments relate to serving and rendering webpages. More specifically, embodiments relate to serving and rendering images as elements within a webpage.

BACKGROUND

Having insufficient resources to encode and communicate a webpage to a client or requesting device is not uncommon. Typically, the serving device will compensate for the insufficient resources by reducing the quality of the image. This can reduce the resources used to encode and communicate the image and therefore the webpage as a whole. The reducing of the quality of the image is commonly called pixelating the image. Pixelated images may not be of a sufficient quality to produce the desired user experience for a user of the webpage.

SUMMARY

In a general aspect, a server device includes a memory and a processor. The memory includes at least one image and code representing a webpage including the at least one image. The processor is configured to select a portion of the at least one image based on resources associated with encoding the at least one image and based on resources associated with communicating the webpage to a user device, encode the selected portion of the at least one image, transmit the webpage, the encoded portion of the at least one image and an indication that the webpage includes the portion of the at least one image to the user device, encode the at least one image, and transmit the encoded at least one image and an indication that the encoded at least one image corresponds to the portion of the at least one image.

In another general aspect, a user device includes a memory and a processor. The memory is configured to store a received webpage and a first image associated with the webpage. The processor is configured to render the webpage, including the first image, on a display of the user device, receive a second image, the first image being a portion of the second image, and replace the first image with the second image using a zoom out rendering technique.

In another general aspect, a method includes selecting a portion of the at least one image based on resources associated with encoding the at least one image and resources associated with communicating the webpage to a user device, encoding the selected portion of the at least one image, transmitting the webpage, the encoded portion of the at least one image and an indication that the webpage includes the portion of the at least one image to a user device, encoding the at least one image, and transmitting the encoded at least one image and an indication that the encoded at least one image corresponds to the portion of the at least one image.

Implementations can include one or more of the following features. For example, at the server device, selecting the portion of the at least one image can includes determining if the resources associated with the encoding of the at least one image and communicating the webpage to the user device are between a first threshold and a second threshold, determining if the resources associated with the encoding of the at least one image and communicating the webpage to the user device are below the second threshold, upon determining the resources are between the first threshold and the second threshold, selecting a first portion of the at least one image based on a first criteria, and upon determining the resources are below the second threshold, selecting a second portion of the at least one image based on a second criteria. Selecting the portion of the at least one image can include selecting one of a first portion of the at least one image and a second portion of the at least one image based on a bit size of a compressed image, the bit size being based on one of a first criteria and a second criteria, a bit size of a compressed image selected based on the second criteria is smaller than a bit size of a compressed image selected based on the first criteria. The selected portion of the at least one image can be from a background section of the at least one image. The portion of the at least one image can have a dimension based on a dimension of the at least one image. The portion of the at least one image can have a dimension based on a dimension of an element of the webpage. The resources associated with communicating the webpage to the user device can be based on at least one of a bandwidth of a network over which the webpage will be carried, a quality of service associated with the network and a quality of service associated with the user device.

Implementations can include one or more of the following features. For example, at the user device, rendering the webpage can include determining an element of the webpage that includes the first image. The user device can decode the second image, and replacing the first image with the second image can be performed after decoding the second image. The user device can decode the second image, and replace the first image with the second image can be performed after decoding a portion of the second image. The zoom out rendering technique can include replacing the first image with a corresponding portion of the second image, and repeatedly adding pixels at the border of the portion of the second image. The zoom out rendering technique can include replacing the first image with a corresponding portion of the second image, and repeatedly adding blocks of pixels at the border of the portion of the second image. The zoom out rendering technique can be processed without user interaction. The user device can determine the first image is a portion of the second image based on information received from a web server.

Implementations can include one or more of the following features. For example, the method can further include rendering the webpage, including the portion of the at least one image, on a display of the user device, receiving, by the user device, the at least one image, and replacing the portion of the at least one image with the at least one image using a zoom out rendering technique. The selecting of the portion of the at least one image can include determining if the resources associated with the encoding of the at least one image and communicating the webpage to the user device are between a first threshold and a second threshold, determining if the resources associated with the encoding of the at least one image and communicating the webpage to the user device are below the second threshold, upon determining the resources are between the first threshold and the second threshold, selecting a first portion of the at least one image based on a first criteria, and upon determining the resources are below the second threshold, selecting a second portion of the at least one image based on a second criteria. The zoom out rendering technique can include replacing the first image with a corresponding portion of the second image, and repeatedly adding pixels at the border of the portion of the second image. The zoom out rendering technique can be processed without user interaction.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 3A, 3B, 3C, 3D and 3E illustrate images and portions of images according to at least one example embodiment.

Figure 1:
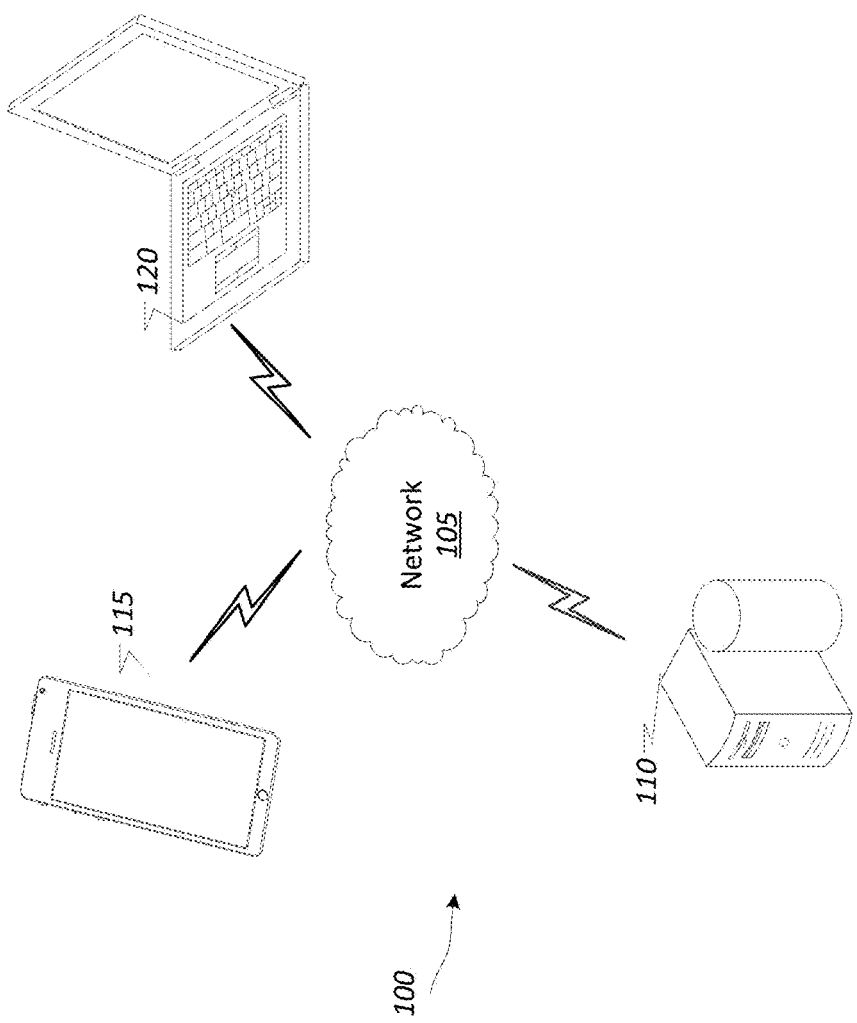
FIG. 1 illustrates a block diagram of a system for serving and displaying web pages according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

As discussed above, a desired user experience may not be acceptable using a pixelated image in a rendered webpage. The pixelated image may be a full size image (e.g., length and width dimensions) communicated with a reduced number of bits. This may cause blurry images to be presented to a user of the webpage. Accordingly, a webpage can be communicated with a full size image or a pixelated image. However, according to example embodiments, the webpage can be communicated with a portion of the image. The portion of the image can be selected from a background of the image. A compressed portion selected from the background should have a minimal number of bits. Alternatively, according to example embodiments, the portion of the image can be selected from an area having some detail. A compressed portion selected from the area having some detail should have a greater number of bits than the compressed background portion.

The webpage can be rendered with the selected portion of the image, thus providing an improved user experience over using a full pixelated image. Then, the full image can be communicated and re-rendered using a zoom out (e.g., pan out) technique. Using the zoom out (e.g., pan out) technique can further improve the user experience as compared to filling in pixels of the pixelated image.

FIG. 1 illustrates a block diagram of a system 100 for serving and displaying web pages according to at least one example embodiment. In the example system 100, the devices 110, 115, and 120 may be a server, a laptop computer, a desktop computer, or a mobile computing device. The mobile computing device 115 and laptop computer 120 can include a display device that can be used as the screen for displaying webpages in a browser. Devices 110, 115, and 120 can include hardware and/or software for executing a browser (e.g., tabbed browser) configured display webpages including at least one image. In some implementations, devices 110, 115, and 120 can be connected to/interfaced with one or more of each other either paired or connected through network 105. The connection can be wired or wireless. The network 105 can be a public communications network or a private communications network.

The system 100 may include electronic storage (not shown in FIG. 1). The electronic storage can include non-transitory storage media that electronically stores information. The electronic storage may be configured to store captured images, obtained images, pre-processed images, post-processed images, and the like.

According to an example implementation, the device 110 can be (or include executable code configured to be) a device (e.g., web server) that generates web pages in response to a request for a webpage from at least one of device 115, and 120. Therefore, the device 110 may be referred to as web server system 110. The webpage can include at least one image. Upon determining resources associated with the web server system 110 and/or the network 105 are insufficient for generating and communicating the webpage including the at least one image at a desired quality to at least one of the device 115, and 120, the web server system 110 can select a portion of the at least one image for inclusion in the webpage.

Upon receiving the webpage including the selected portion of the at least one image, the at least one device 115, 120 can render the webpage on a display of the device 115, 120. Further, the at least one device 115, 120 can be receiving the at least one image (e.g., in the background). Upon completion of the receipt (or a threshold portion thereof) of the at least one image, the at least one device 115, 120 can decode and replace the portion of the at least one image in the displayed webpage. Replacing the portion of the at least one image can include a zoom out (e.g., pan out) operation on the at least one image starting from the portion of the at least one image.

Figure 2B:
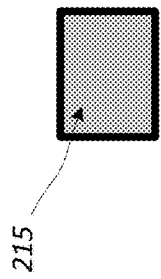
FIGS. 2A, 2B and 2C illustrate images and portions of images according to at least one example embodiment.
Figure 2C:
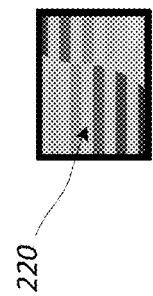
Figure 2A:
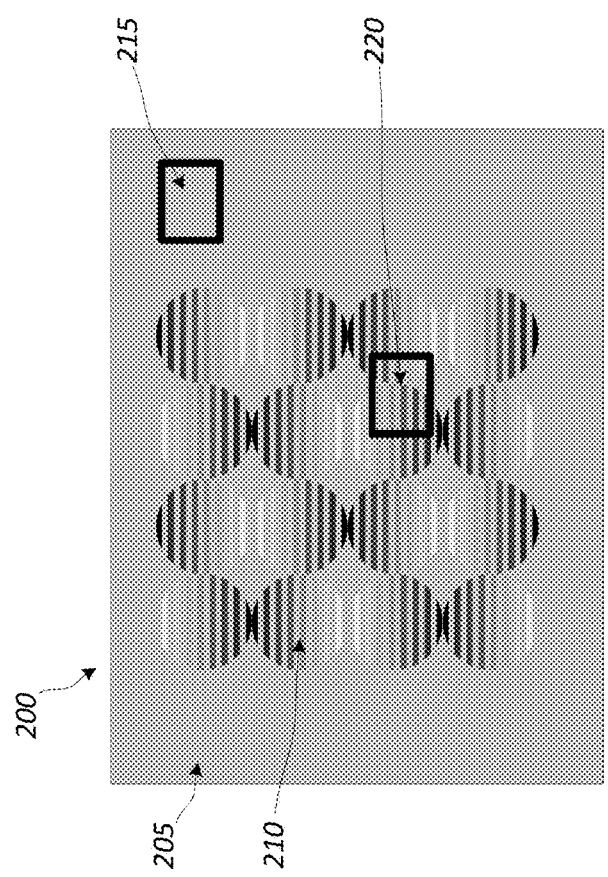

FIGS. 2A, 2B and 2C illustrate images and portions of images according to at least one example embodiment. FIG. 2A illustrates an image 200. The image 200 includes a background 205 section and a pattern section 210. A first threshold can be set high enough such that an entire image 200 can be encoded, communicated and rendered in association with a webpage so that processing of the image 200 does not cause delay in the communicating and rendering of the webpage on a user device. In this example, image 200 could be encoded, communicated in association with a web page and rendered on a user device (e.g., user device 115, 120). Accordingly, in this scenario the user of the device is presented with a webpage in accordance with a desired user experience and with a complete image.

However, system resources may not be sufficient to produce the desired user experience and display the entire image 200. Therefore, according to example embodiments, a portion of the image 200 can be communicated. As shown in FIGS. 2A and 2B, a first portion 215 of the image 200 can be selected from the background 205 section. As shown in FIGS. 2A and 2C, a second portion 220 of the image 200 can be selected from the pattern section 210. After encoding the first portion 215 and the second portion 220, a compressed file corresponding to the first portion 215 should be smaller in size (e.g., number of bits) than a compressed file corresponding to the second portion 220.

Accordingly, a second threshold can be configured to indicate that the system resources are sufficient to encode and communicate a webpage including a portion of the image 200 where the portion of the image is one of the first portion 215 and the second portion 220. For example, the second threshold can be configured to trigger the selection of the second portion 220 if the system resources are greater than the second threshold and trigger the selection of the first portion 215 if the system resources are less than the second threshold. In other words, if the system resources are greater than the first threshold, the full or entire image 200 can be encoded and communicated in association with the webpage. If the system resources are less than the first threshold and greater than the second threshold, the second portion 220 can be encoded and communicated in association with the webpage. If the system resources are less than the second threshold, the first portion 215 can be encoded and communicated in association with the webpage. In some example implementations, the first threshold and the second threshold can be somewhat close because the user experience may be affected by having too much (or too little) detail.

Accordingly, a first criterion and a second criterion can be configured for selection of the first portion 215 and the second portion 220. The criterion can be based on a number of bits in an encoded portion of the image 200. The first criteria can be based on the portion of the image having a high level of detail as compared to a portion of the image having characteristics within the second criteria.

For example, a portion of the image meeting the second criteria (the first portion 215) can have little detail like, for example, a background for the image (as illustrated in FIGS. 2A and 2B). A portion of the image (e.g., the second portion 220) meeting the first criteria can have significant detail like, for example, a pattern, a face, letters and the like within the image (as illustrated in FIGS. 2A and 2C). In other words, the number of bits of a compressed image selected based on the second criteria is smaller than the number of bits of a compressed image selected based on the first criteria.

FIGS. 3A, 3B, 3C, 3D and 3E illustrate images and portions of images according to at least one example embodiment. As shown in FIG. 3A, a first image 305 can correspond to a decoded portion of an image. For example, the first image 305 can be a decoded and rendered image corresponding to the second portion 220 communicated to user device 115, 120 as an element of a received and rendered webpage (not shown). In a subsequent data packet the user device 115, 120 can receive and decode the full image associated with the first image 305. The full image is illustrated in FIG. 3E as full image 325. After receiving and decoding the full image, the user device 115, 120 can replace the first image 305 in the webpage with a sequence of images until the full image 325 is displayed in the webpage.

For example, image 310 shown in FIG. 3B can replace the first image 305. Subsequently, image 315 shown in FIG. 3C can replace image 310. Then, image 320 shown in FIG. 3D can replace image 315. Finally, full image 325 can replace image 320. In other words, continually larger and more detailed images based on the full image 325 can be rendered and re-rendered within the element of the webpage that initially included image 305. In addition, the rendered image can be resized to the element of the webpage within which the image is displayed. Resizing the image can be based on the amount of detail in the image and the desired user experience. For example resizing an image with a significant amount of detail may result in an undesirable user experience.

The continual re-rendering with additional detail or pixels and resizing of the image can have the effect of panning or zooming out and be viewed as motion by a user of the user device 115, 120 (even though the image is a still image). This motion effect from a still image is also known as the Ken Burns effect.

Figure 4:
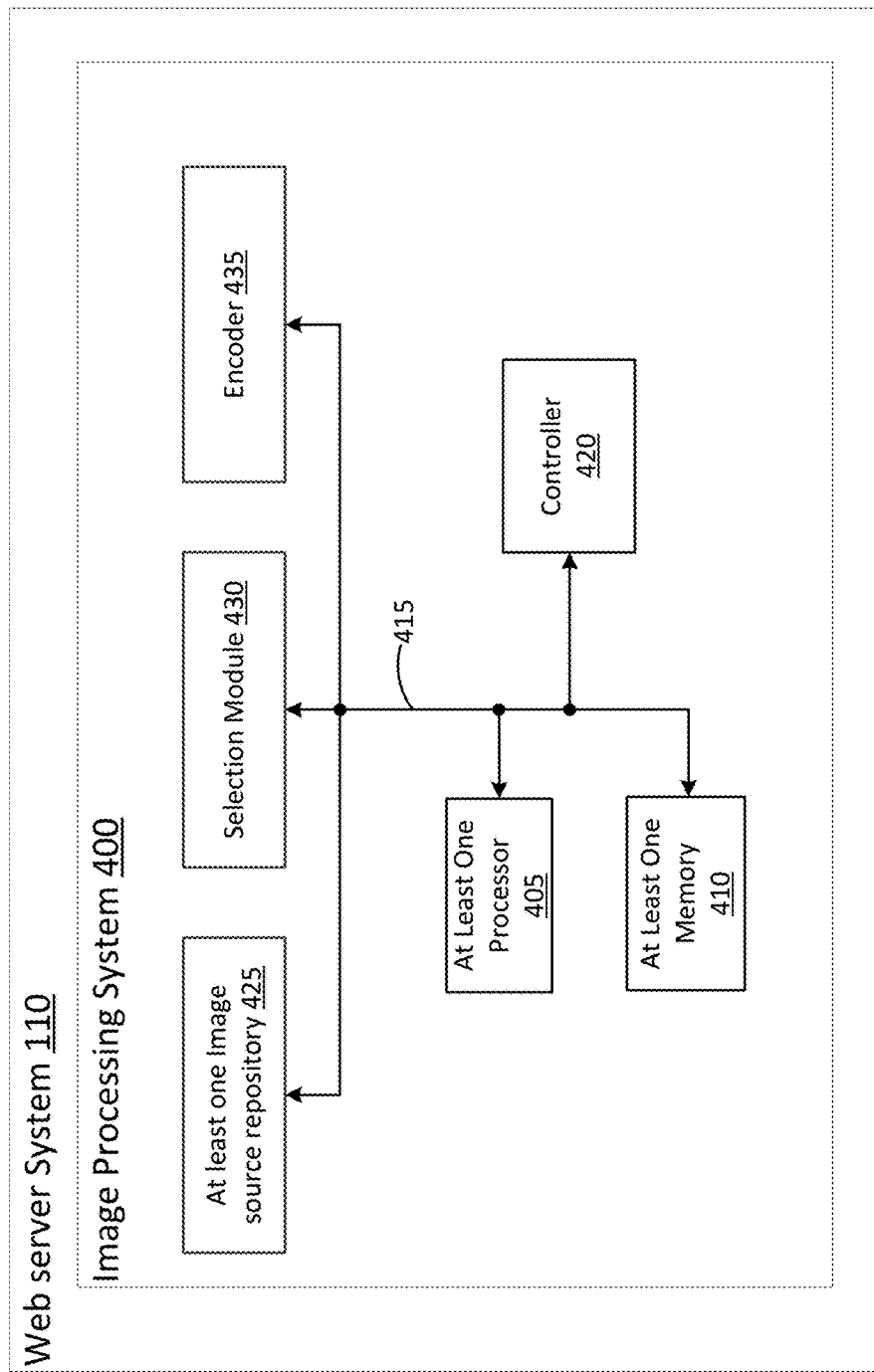
FIG. 4 illustrates a block diagram of an image processing system according to at least one example embodiment.

FIG. 4 illustrates a block diagram of an image processing system according to at least one example embodiment. As shown in FIG. 4, the web server system 110 includes an image processing system 400. The image processing system 400 includes at least one processor 405, at least one memory 410, a controller 420, an at least one image source repository 425, a selection module 430 and an encoder 435. The at least one processor 405, the at least one memory 410, the controller 420, the at least one image source repository 425, the selection module 430 and the encoder 435 are communicatively coupled via bus 415.

The at least one processor 405 may be utilized to execute instructions stored on the at least one memory 410, so as to thereby implement the various features and functions described herein, or additional or alternative features and functions. The at least one processor 405 and the at least one memory 410 may be utilized for various other purposes. In particular, the at least one memory 410 can represent an example of various types of memory and related hardware and software which might be used to implement any one of the modules described herein.

The at least one memory 410 may be configured to store data and/or information associated with the image processing system 400. For example, the at least one memory 410 may be configured to store codecs associated with encoding images and/or algorithms for selecting a portion of an image. For example, the at least one memory 410 may be configured to store code associated with selecting a portion of an image based on available system resources. The at least one memory 410 may be a shared resource. For example, the image processing system 400 may be an element of a larger system (e.g., a server, a personal computer, a mobile device, and the like). Therefore, the at least one memory 410 may be configured to store data and/or information associated with other elements (e.g., image/video serving, web browsing or wired/wireless communication) within the larger system.

The controller 420 may be configured to generate various control signals and communicate the control signals to various blocks in image processing system 400. The controller 420 may be configured to generate the control signals to implement the techniques described herein. The controller 420 may be configured to control the encoder 435 to encode an image, a portion of an image, a plurality of images, and the like according to example embodiments. For example, the controller 420 may generate control signals corresponding to parameters for selecting a portion of an image and encoding the selected portion.

The encoder 435 may be configured to receive an image input (e.g., from the at least one image source repository 425) and output compressed (e.g., encoded) image bits. The encoder 435 may further convert each image (or portion of an image) into a matrix of blocks (hereinafter referred to as blocks). For example, an image may be converted to a 16×16, a 16×8, an 8×8, a 4×4, a 4×2 or a 2×2 matrix of blocks each having a number of pixels. Although six example matrices are listed, example embodiments are not limited thereto.

The at least one image source repository 425 can be configured to store an image, metadata associated with the image data and/or other image data in. In one implementation, the at least one image source repository 425 is a volatile memory unit or units. In another implementation, the at least one image source repository 425 is a non-volatile memory unit or units. The at least one image source repository 425 may also be another form of computer-readable medium, such as a magnetic or optical disk. The at least one image source repository 425 can be a non-transitory computer readable medium.

The selection module 430 can be configured to determine available resources associated with encoding images for the webpage. For example, the selection module can be configured to determine a size of an image to be encoded, a quality factor (associated with encoding the image) and a size of a compressed number of bits (e.g., the output of the encoder 435). Then, the selection module 430 can determine an amount of resources (e.g., memory and processing) corresponding to the aforementioned encoding or encoding parameters. In an example implementation, the selection module 430 can estimate the amount of resources based on, for example, an algorithm having image size, quality and compression as an input, and/or by using a look-up table.

The selection module 430 can also be configured to determine available resources for communicating the webpage to the user device 115, 120. For example, the selection module 430 can determine an available bandwidth. In an example implementation, the bandwidth can be based on a quality of service (QoS) for at least one of the user device 115, 120, the web server system 110 or the network 105.

The selection module 430 can also be configured to select a portion of an image based on the determined available resources associated with encoding images for the webpage and/or the determined available resources for communicating the webpage to the user device 115, 120. For example, if the determined available resources associated with encoding images for the webpage and/or the determined available resources for communicating the webpage to the user device 115, 120 is above a first threshold, an entire image can be selected. If the determined available resources associated with encoding images for the webpage and/or the determined available resources for communicating the webpage to the user device 115, 120 is between the first threshold and a second threshold, the portion of the image can be selected based on a first criteria. If the determined available resources associated with encoding images for the webpage and/or the determined available resources for communicating the webpage to the user device 115, 120 is below second threshold, the portion of the image can be selected based on a second criteria.

In an example implementation, the first threshold and the second threshold can be based on a perceived user experience. For example, the first threshold can be set high enough such that the entire image can be encoded, communicated and rendered in association with the webpage so that the image does not cause delay (beyond a typical webpage delay) in the rendering of the webpage on the user device 115, 120. For example, the second threshold can be set high enough such that a portion of the image can be encoded, communicated and rendered in association with the webpage so that the image does not cause delay (beyond a typical webpage delay) in the rendering of the webpage on the user device 115, 120. The portion of the image can be based on a first criterion. The first criteria can be based on the portion of the image having a high level of detail as compared to a portion of the image having characteristics within the second criteria.

For example, a portion of the image meeting the second criteria can have little detail like, for example, a background for the image. A portion of the image meeting the first criteria can have significant detail like, for example, a pattern, a face, letters and the like within the image. In other words, the bit size of a compressed image having the second criteria is smaller than the bit size of a compressed image having the first criteria. See the description of FIG. 2A-2C above for an additional example.

In some implementations, the portion of the image (e.g., the first portion 215 and/or the second portion 220) can have a size, dimension and or shape based on the element of the webpage in which the image is to be displayed. For example, the element of the webpage can have an associated tag (e.g., html tag) including a height attribute and a width attribute. The selected portion can have a height and width that is a percentage (e.g., 5%, 10% and the like) of the element attribute. Alternatively, the selected portion can have a height and width that is a percentage (e.g., 5%, 10% and the like) of the full image (e.g., image 200).

Figure 5:
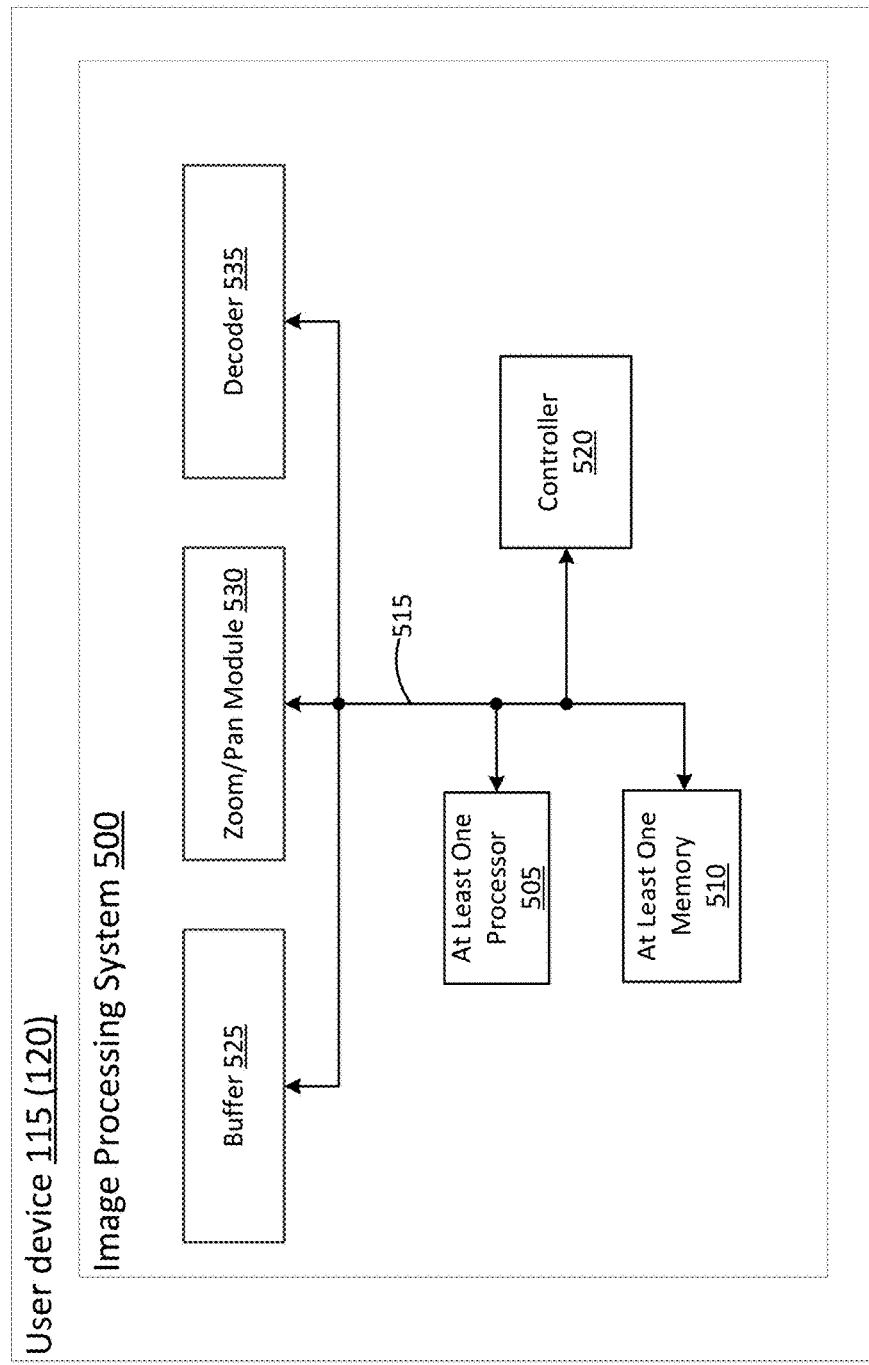
FIG. 5 illustrates a block diagram of another image processing system according to at least one example embodiment.

FIG. 5 illustrates a block diagram of another image processing system according to at least one example embodiment. As shown in FIG. 5, the user device 115, 120 includes an image processing system 500. The image processing system 500 includes at least one processor 505, at least one memory 510, a controller 520, a buffer 525, a zoom/pan module 530 and a decoder 535. The at least one processor 505, the at least one memory 510, the controller 520, the buffer 525, the zoom/pan module 530 and the decoder 535 are communicatively coupled via bus 515.

The at least one processor 505 may be utilized to execute instructions stored on the at least one memory 510, so as to thereby implement the various features and functions described herein, or additional or alternative features and functions. The at least one processor 505 and the at least one memory 510 may be utilized for various other purposes. In particular, the at least one memory 510 can represent an example of various types of memory and related hardware and software which might be used to implement any one of the modules described herein.

The at least one memory 510 may be configured to store data and/or information associated with the image processing system 500. For example, the at least one memory 510 may be configured to store codecs associated with decoding images and/or algorithms for replacing an image in a webpage. For example, the at least one memory 510 may be configured to store code associated with replacing a portion of an image with a corresponding image with a zoom out/pan out effect. The at least one memory 510 may be a shared resource. For example, the image processing system 500 may be an element of a larger system (e.g., a server, a personal computer, a mobile device, and the like). Therefore, the at least one memory 510 may be configured to store data and/or information associated with other elements (e.g., image/video serving, web browsing or wired/wireless communication) within the larger system.

The controller 520 may be configured to generate various control signals and communicate the control signals to various blocks in image processing system 500. The controller 520 may be configured to generate the control signals to implement the techniques described herein. The controller 520 may be configured to control the decoder 535 to decode an image, a portion of an image, a plurality of images, and the like according to example embodiments. For example, the controller 520 may generate control signals corresponding to parameters to implement a zoom out/pan out effect while rendering a decoded image.

The decoder 535 may be configured to receive compressed (e.g., encoded) image bits and output a corresponding image. The decoder 535 may further upscale and color convert a decoded image (or portion of an image) for rendering the image on a display of a computing device (e.g., user device 115, 120). The buffer 525 can be a memory (e.g., a temporary or volatile memory) configured to store compressed bits representing an image before decoding and/or to store an image after decoding and prior to being rendered on a display associated with the user device 115, 120. The buffer 525 can be a reserved portion of the at least one memory 510. Alternatively, or in addition to, the buffer 525 can be a standalone memory.

In some implementations, the decoder 535 can resize the decoded image based on the element of the webpage in which the image is to be displayed. For example, the element of the webpage can have an associated tag (e.g., html tag) including a height attribute and a width attribute. The can be resized to the size of the element attribute. Alternatively, the selected portion can have a height and width that is a percentage (e.g., 5%, 10% and the like) of the full image (e.g., image 200).

The zoom/pan module 530 may be configured to generate a sequence of images having a zoom out/pan out effect starting from the portion of the image to the full or entire (e.g., substantially all of the pixels of the) image. The zoom/pan module 530 may be configured to generate a sequence of images having a zoom out/pan out effect without user interaction (e.g., without the user performing a gesture on the display of the device).

For example, after decoding an image, the image can be divided into a plurality of equal (or substantially equal) sized blocks. The blocks corresponding to the portion of the image can be rendered as a replacement of the portion of the image in the webpage. Then, blocks can be added and re-rendered until the full image is rendered within the webpage. For example, blocks can be added above, below, to the left and or to the right as columns or rows of blocks (as long as there are columns or rows of blocks to be added). In other words, repeatedly adding blocks of pixels at the border of the portion of the image and/or repeatedly adding pixels at the border of the portion of the image. The border can be a boundary, a perimeter of the portion of the image and/or a top, bottom, left and/or right side of the portion of the image. The border of the image can be the portion of the image and/or the iteration of the re-rendered portion of the image.

In another implementation, a center, width and height (or center and radius) can be defined. Initially, the center, width and height can be set to a value based on a position of the portion of the image. Then, the center, width and height can be dynamically moved and expanded with a re-render of the image after the change. This dynamic change can be repeated until the full image is rendered.

In still another implementation, images can be rendered on the user device as z-ordered layers. Accordingly, the decoded image can be rendered in a first layer and a second layer can be transitioned from a condition or state that blocks display of the first layer to a translucent condition or state that allows display of the first layer. The transition can implement a zoom out (e.g., pan out) effect.

In addition, the rendered image is resized to the element of the webpage within which the image is displayed. The continual re-rendering with additional blocks and resizing of the image can have the effect of zooming out and be viewed as motion by a user of the user device 115, 120 even though the image is a still image. As stated above, this motion effect from a still image is also known as the "Ken Burns effect".

Figure 6:
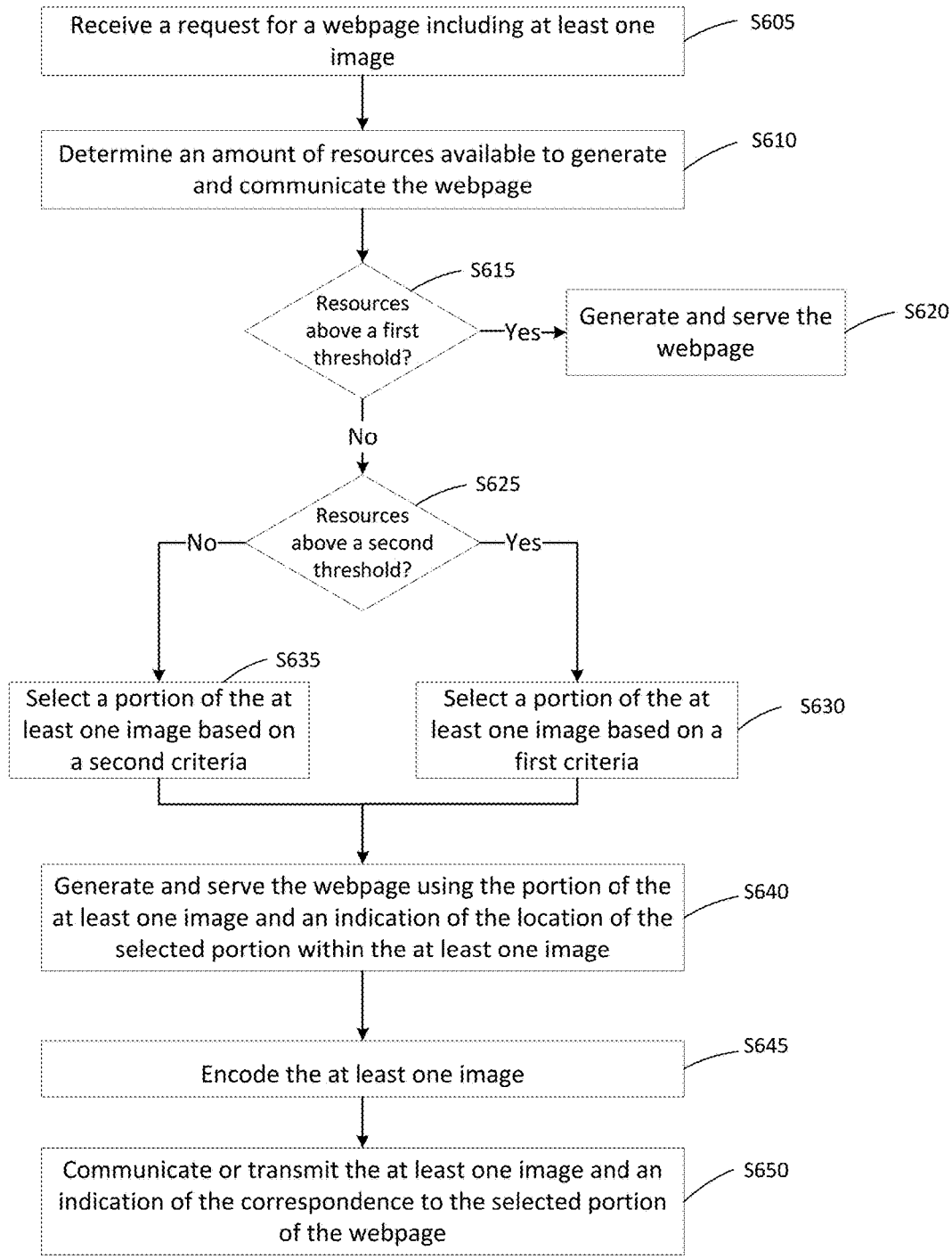
FIGS. 6 and 7 illustrate flowcharts of methods according to at least one example embodiment.
Figure 7:
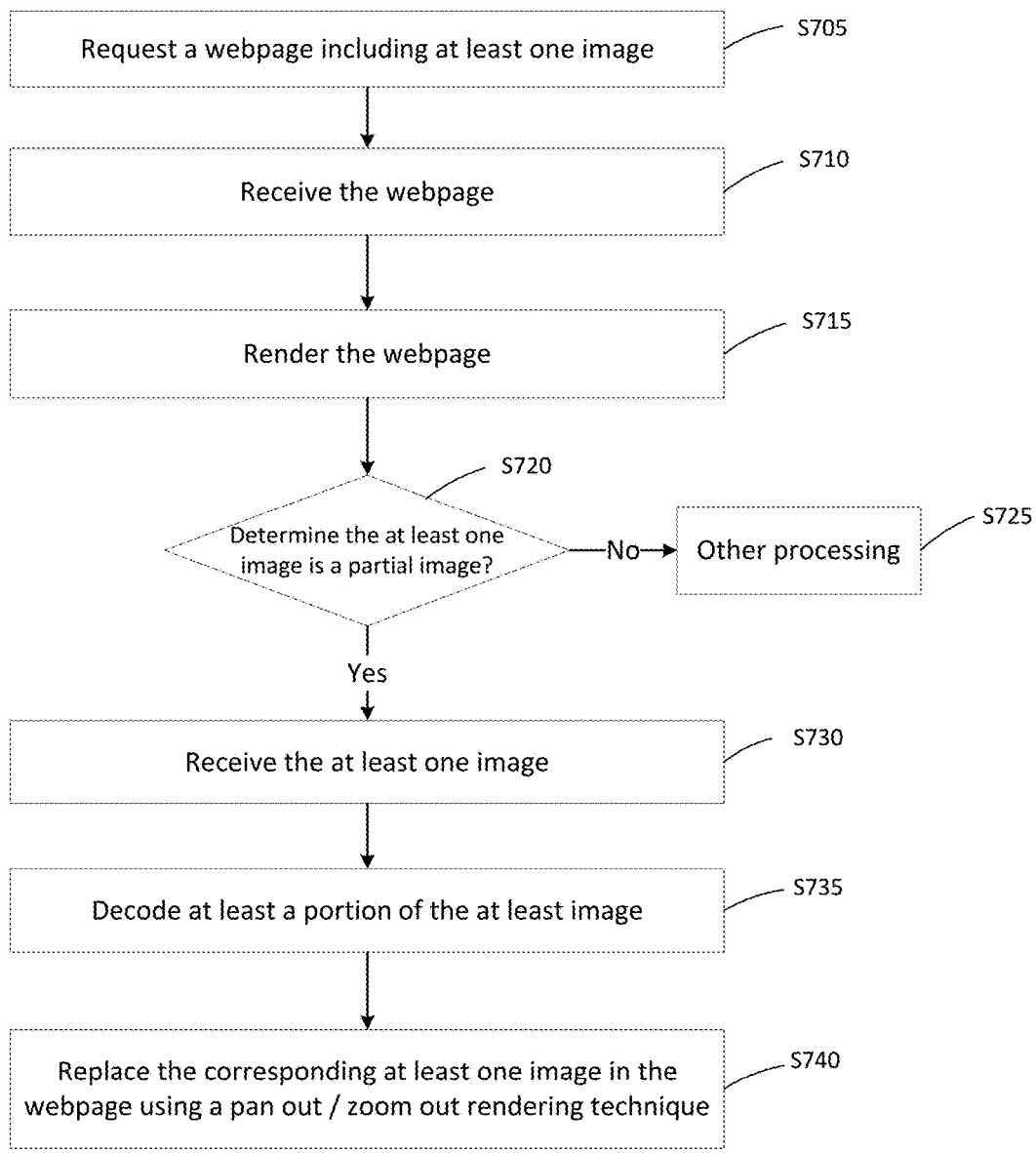

FIGS. 6 and 7 are flowcharts of methods according to example embodiments. The steps described with regard to FIGS. 6 and 7 may be performed due to the execution of software code stored in a memory (e.g., at least one memory 410, 510) associated with an apparatus (e.g., as shown in FIGS. 1-3) and executed by at least one processor (e.g., at least one processor 405, 505) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 6 and 7.

FIG. 6 illustrates a flowchart of a method for generating and communicating a webpage according to at least one example embodiment. As shown in FIG. 6, in step S605 a request for a webpage including at least one image is received. For example, the web server system 110 can host a website including a webpage. The web server system 110 can receive a request for the webpage from user device 115, 120. The request can be received via network 105. The request can be a communication using an internet and/or intranet protocol. For example, the communication can use a Hypertext Transfer Protocol (HTTP) or Hypertext Transfer Protocol Secure (HTTPS) protocol. The webpage can include at least one image. The at least one image can be stored in the at least one image source repository 425.

In step S610 an amount of resources available to generate and transmit (e.g., communicate) the webpage is determined. For example, the selection module 430 can be configured to determine available resources associated with encoding images for the webpage. For example, the selection module 430 can be configured to determine a size of an image to be encoded, a quality factor (associated with encoding the image) and a size of a compressed number of bits (e.g., the output of the encoder 435). Then, the selection module 430 can determine an amount of resources (e.g., memory and processing) corresponding to the aforementioned encoding or encoding parameters. In an example implementation, the selection module 430 can estimate the amount of resources based on, for example, an algorithm having image size, quality and compression as an input, and/or by using a look-up table.

The selection module 430 can also be configured to determine available resources for communicating the webpage to the user device 115, 120. For example, the selection module 430 can determine an available bandwidth. In an example implementation, the bandwidth can be based on a quality of service (QoS) for at least one of the user device 115, 120, the web server system 110 or the network 105. Accordingly, the amount of resources available to generate and transmit (e.g., communicate) the webpage can be determined based on the resources associated with encoding images for the webpage and/or an available bandwidth for communicating the webpage (e.g., via network 105) to the user device 115, 120.

In step S615 whether or not the resources are above a first threshold is determined. If the resources are above the first threshold, processing continues to step S620. Otherwise, processing continues to step S625. For example, if the determined available resources associated with encoding images for the webpage and/or the determined available resources for communicating the webpage to the user device 115, 120 is above the first threshold, an entire image can be selected by selection module 430 and encoded by encoder 435.

In step S620 the webpage is generated and served to the requesting device. For example, the requested webpage can be generated (e.g., the HTML code for the webpage can be selected) by the web server system 110 and the associated encoded image(s) can be packaged together in at least one data packet and transmitted (e.g., communicated) to the user device 115, 120 via network 105 and the process ends or moves on to some other processing.

In step S625 whether or not the resources are above a second threshold is determined. If the resources are above the second threshold, processing continues to step S630. Otherwise, processing continues to step S635. In step S630 a portion of the at least one image is selected based on a first criteria. In other words, if the determined available resources associated with encoding images for the webpage and/or the determined available resources for communicating the webpage to the user device 115, 120 is between the first threshold and a second threshold, the portion of the image can be selected based on a first criteria. Otherwise, in step S635 a portion of the at least one image is selected based on a second criteria.

The first threshold and the second threshold can be based on a perceived user experience. For example, the first threshold can be set high enough such that the entire image can be encoded, transmitted (e.g., communicated) and rendered in association with the webpage so that the image does not cause delay (beyond a typical webpage delay) in the rendering of the webpage on the user device 115, 120. For example, the second threshold can be set high enough such that a selected portion of the image can be encoded, transmitted (e.g., communicated) and rendered in association with the webpage so that the image does not cause delay (beyond a typical webpage delay) in the rendering of the webpage on the user device 115, 120.

The portion of the image can be based on a first criteria. The first criteria can be based on the portion of the image having a high level of detail as compared to a portion of the image having characteristics within the second criteria.

For example, a portion of the image meeting the second criteria can have little detail like, for example, a background for the image. A portion of the image meeting the first criteria can have significant detail like, for example, a pattern, a face, letters and the like within the image. In other words, the bit size of an encoded or compressed image having the second criteria may be smaller than the bit size of a compressed image having the first criteria. See the description of FIG. 2A-2C above for an additional example.

In step S640 the webpage is generated using the portion of the at least one image and an indication of the location of the selected portion within the at least one image and served to the requesting device. For example, the selected portion of the image is encoded by encoder 435. The requested webpage can be generated (e.g., the HTML code for the webpage can be selected) by the web server system 110, the associated encoded image portion (or portions of images) and an indication that the encoded image is a portion of an image can be packaged together in at least one data packet and transmitted (e.g., communicated) to the user device 115, 120 via network 105.

In step S645 the at least one image is encoded. For example, the at least one image can be communicated (e.g., controlled by controller 420 as input) to the encoder 435. Then the controller 420 can control the encoder 435 to encode the at least one image based on, for example, a selected quality and bitrate.

In step S650 the at least one image and an indication of the correspondence to the selected portion of the webpage is transmitted to the requesting device. For example, the controller 420 can generate a data packet including the compressed bits corresponding to the at least one image and include an indication that the data packet and/or the compressed bits correspond to the previously transmitted webpage and/or an element associated with the web page. For example, the data packet can include a name, link and/or address corresponding to the webpage and a tag (e.g., HTML tag) corresponding to the at least one image or an element containing the at least one image. The data packet can then be transmitted to the user device 115, 120 via network 105.

FIG. 7 illustrates a flowchart of a method for rendering a webpage according to at least one example embodiment. As shown in FIG. 7, in step S705 a webpage including at least one image is requested. For example, the web server system 110 can host a website including a webpage. The user device 115, 120 can request the webpage from the web server system 110. The request can be transmitted to the web server system 110 via network 105. The request can be a communication using an internet and/or intranet protocol. For example, the communication can use a Hypertext Transfer Protocol (HTTP) or Hypertext Transfer Protocol Secure (HTTPS) protocol. The requested webpage can include at least one image.

In step S710 the webpage is received. For example, the webpage is received by the user device 115, 120. In step S715 the webpage is rendered. For example, HTML code associated with the webpage can be interpreted by the user device 115, 120 and rendered on a display of the user device 115, 120.

In step S720 whether or not the at least one image is a partial image is determined. For example, the received webpage can include an associated indication that the webpage includes a portion of an image. Alternatively, or in addition to, the buffer 525 can include an image to be decoded (or in the process of being decoded) that includes an associated indication that the image is associated with the rendered webpage. If the at least one image is determined to be a partial image, processing continues to step S730. Otherwise, processing continues to step S725 in which some other processing is performed.

In step S730 the at least one image is received. For example, controller 520 can control the receiving of compressed bits corresponding to the at least one image into buffer 525. The at least one image can include an associated indication that the image is associated with the rendered webpage. For example, a data packet associated with the received compressed bits corresponding to the at least one image can include an indication (e.g., a name, link and/or address corresponding to the webpage) and a tag (e.g., HTML tag) corresponding to the at least one image or an element containing the at least one image.

In step S735 at least a portion of the at least image is decoded. For example, the controller 520 can instruct the decoder 535 to read compressed bits from buffer 525 and decode the compressed bits into a corresponding image (noting the corresponding image can be a lossy version (e.g., lower quality) of the original image). The decoded image can be stored in buffer 525.

In step S740 the corresponding at least one image is replaced in the webpage using a zoom out/pan out rendering technique. For example, the controller 520 can instruct the zoom/pan module 530 to read the decoded image from the buffer 525. The zoom/pan module 530 can generate a sequence of images having a zoom out/pan out effect starting from the portion of the image (as currently displayed in the webpage) to the full or entire (e.g., substantially all of the pixels of the) image. For example, the decoded image can be divided into a plurality of equal (or substantially equal) sized blocks. The blocks corresponding to the portion of the image can be rendered as a replacement of the portion of the image in the webpage. Then, blocks can be added and re-rendered until the full image is rendered within the webpage.

For example, blocks can be added above, below, to the left and or to the right as columns or rows of blocks (as long as there are columns or rows of blocks to be added). In addition, the rendered image can be resized to the element of the webpage within which the image is displayed. The continual re-rendering with additional blocks and resizing of the image can have the effect of zooming out and be viewed as motion by a user of the user device 115, 120 even though the image is a still image. In one example implementation the image can be replaced upon determining the image is completely decoded. In another example implementation the image can be replaced upon determining a threshold percentage on the image is decoded.

A web browser executed by a client device can receive code (e.g., HTML code) from a remote server (e.g., a remote server that hosts a website) and can execute the received code on the client device for the benefit of a user of the client device.

In various implementations, a web page includes a file or document which is a portion of a website. In various implementations, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, and the like. In various implementations, the web browser may process at least one web page in order to render one web page. For example, an HTML web page may be modified or include other web pages, such as, JavaScripts, a CSS file, various images, and the like. Generally, once the aforementioned file or document is rendered (or executed) by a web browser, the web page becomes viewable to a user. It is understood that the above is merely one illustrative example to which the disclosed subject matter is not limited.

In various implementations, a website may include a collection or grouping of related webpages. For example, when a website is accessed via a communications network, the website may be accessed via the Hypertext Transfer Protocol (HTTP) or Hypertext Transfer Protocol Secure (HTTPS). It is understood that the above is merely one illustrative example to which the disclosed subject matter is not limited.

In some implementations, the webpage can be implemented as an application (app), a web application (web app), and/or a hosted application where an element of the application or web application includes requesting and receiving information including at least one image using a technique similar to requesting and receiving a webpage (e.g., via a webserver).

Accordingly, the web browser may include or have installed one or more web applications. In this context, a web application may be configured to perform a single task or multiple tasks for a user. In such an implementation, the web application may be configured to be executed or interpreted by the web browser. Thus, web applications can be run inside a web browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be hosted web applications, or packaged web applications. Hosted web applications can grant a small number of additional permissions to a specific website, such as the ability to use more than the normal quota of temporary storage space, use geolocation features without additional confirmation prompts beyond a single install-time one, and the ability to always have a hidden page open which is performing tasks such as synchronizing data for offline use or receiving server-pushed notifications to display to the user. Hosted web applications also get special treatment in a user interface, in that hosted web applications may be shown with a large icon that can be clicked to launch the application either in a tab or in a standalone (possibly full screen) window.

Installable web applications are a way of making a browser treat certain websites like applications. Many installable web applications are hosted web applications with extra metadata (such as a small manifest file that describes the application). Packaged web applications are a type of installable web applications. Packaged applications can be thought of as web applications whose code is bundled, so that the user can download all of the content of the web application for execution by the browser or in a standalone window. A packaged web application may not need to have network access to perform its functionality for the user, and rather may be executed successfully by the browser locally on the computing device without access to a network.

Packaged web applications have the option of using extension application programming interfaces (APIs), allowing packaged apps to change the way the browser behaves or looks. In some cases, packaged web applications may operate without appearing to run in a browser, e.g., without the browser chrome, tabs, or other user interface of the browser. In such a case, the packaged web applications would operate in a standalone window without access to content scripts or APIs related to browser state such as cookies, history, bookmarks, open tabs, etc.

Figure 8:
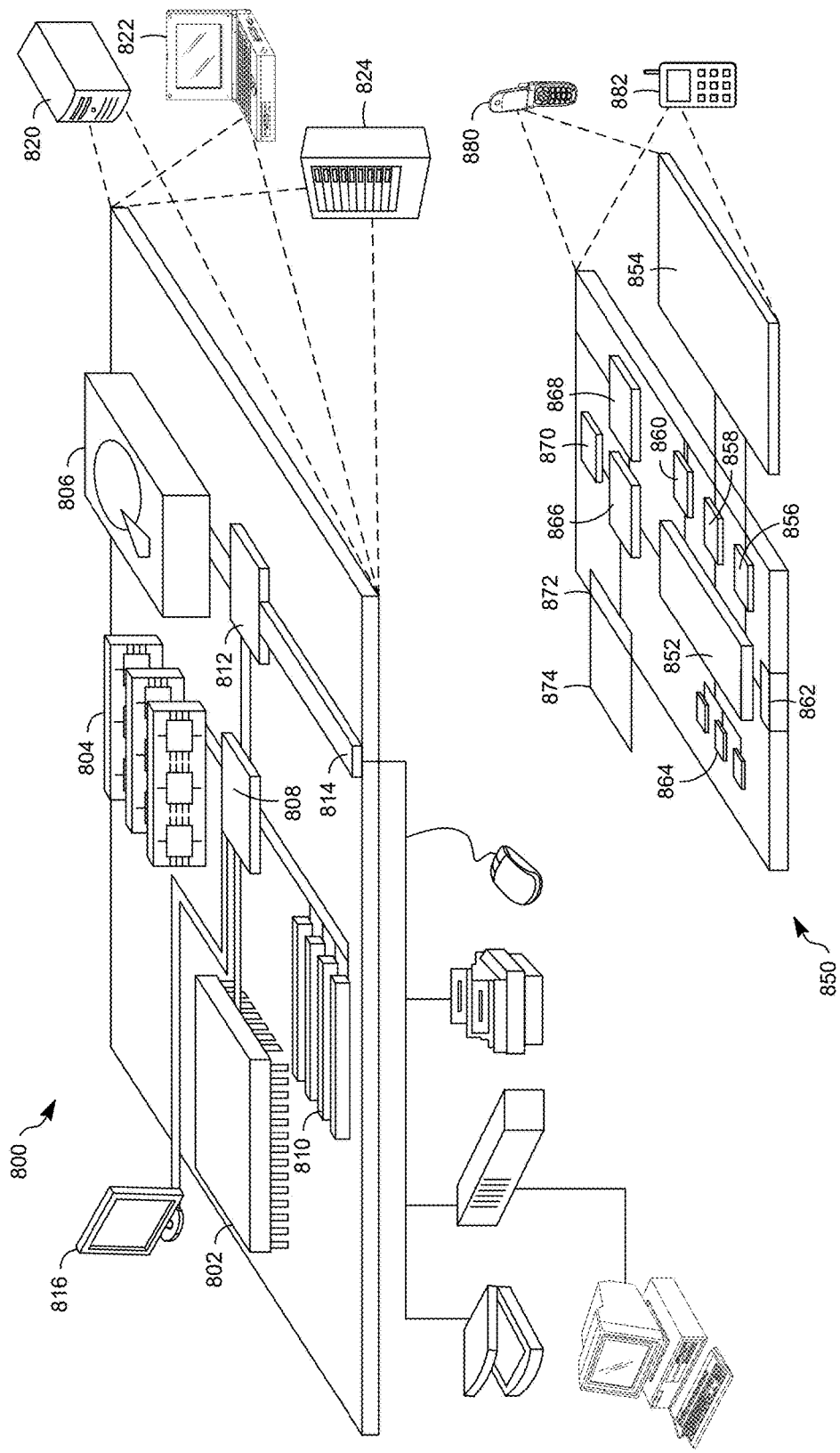
FIG. 8 shows an example of a computer device and a mobile computer device according to at least one example embodiment.

FIG. 8 shows an example of a computer device 800 and a mobile computer device 850, which may be used with the techniques described here. Computing device 800 is intended to represent various forms of digital computers, such as laptops, desktops, workstations, personal digital assistants, servers, blade servers, mainframes, and other appropriate computers. For example, computing device 800 can be an example implementation of web server system 110. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document. For example, computing device 850 can be an example implementation of user device 110, 115.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A server device comprising:
a memory storing at least one image and code representing a webpage including the at least one image, the at least one image having a first area; and
a processor configured to:
determine a first amount of resources available to encode the at least one image;
determine a second amount of resources available for communicating the webpage to a user device;
determine if the first amount of resources and the second amount of resources is greater than or equal to a first threshold;
in response to determining the first amount of resources and the second amount of resources is greater than or equal to the first threshold, encode the at least one image and transmit the webpage and the encoded at least one image; and
in response to determining the first amount of resources and the second amount of resources is less than the first threshold:
select a first portion of the at least one image based on the first amount of resources and based on the second amount of resources, the first portion of the at least one image having a second area that is smaller than the first area,
encode the first portion of the at least one image,
transmit the webpage, the encoded first portion of the at least one image and an indication that the webpage includes the first portion of the at least one image to the user device,
select a second portion of the at least one image, the second portion of the at least one image having a third area that is larger than the second area,
encode the second portion of the at least one image, and
transmit the encoded second portion of the at least one image and an indication that the encoded second portion of the at least one image corresponds to the first portion of the at least one image.

2. The server device of claim 1, wherein selecting the portion of the at least one image includes:
determining if the resources associated with the encoding of the at least one image and communicating the webpage to the user device are between the first threshold and a second threshold;
determining if the resources associated with the encoding of the at least one image and communicating the webpage to the user device are below the second threshold;
upon determining the resources are between the first threshold and the second threshold, selecting a first portion of the at least one image based on a first criteria; and
upon determining the resources are below the second threshold, selecting a second portion of the at least one image based on a second criteria.

3. The server device of claim 1, wherein selecting the portion of the at least one image includes:
selecting one of a first portion of the at least one image and a second portion of the at least one image based on a bit size of a compressed image,
the bit size being based on one of a first criteria and a second criteria,
a bit size of a compressed image selected based on the second criteria is smaller than a bit size of a compressed image selected based on the first criteria.

4. The server device of claim 1, wherein the first portion of the at least one image is from a background section of the at least one image.

5. The server device of claim 1, wherein the first portion of the at least one image has a dimension based on a dimension of the at least one image.

6. The server device of claim 1, wherein the first portion of the at least one image has a dimension based on a dimension of an element of the webpage.

7. The server device of claim 1, wherein the resources associated with communicating the webpage to the user device are based on at least one of a bandwidth of a network over which the webpage will be carried, a quality of service associated with the network and a quality of service associated with the user device.

8. A method comprising:
- determining a first amount of resources available to encode at least one image;
- determining a second amount of resources available for communicating a webpage including the at least one image to a user device;
- determining if the first amount of resources and the second amount of resources is greater than or equal to a first threshold;
- in response to determining the first amount of resources and the second amount of resources is greater than or equal to the first threshold, encoding the at least one image and transmitting the webpage and the encoded at least one image; and
- in response to determining the first amount of resources and the second amount of resources is less than the first threshold:
  - selecting a first portion of the at least one image based on the first amount of resources and based on the second amount of resources, the at least one image having a first area and the first portion of the at least one image having a second area that is smaller than the first area;
  - encoding the first portion of the at least one image;
  - transmitting the webpage, the encoded first portion of the at least one image and an indication that the webpage includes the first portion of the at least one image to the user device;
  - selecting a second portion of the at least one image, the second portion of the at least one image having a third area that is larger than the second area,
  - encoding the second portion of the at least one image; and
  - transmitting the encoded second portion of the at least one image and an indication that the encoded second portion of the at least one image corresponds to the first portion of the at least one image.

9. The method of claim 8, further comprising:
- rendering the webpage, including the first portion of the at least one image, on a display of the user device;
- receiving, by the user device, the second portion of the at least one image; and
- replacing the first portion of the at least one image with the second portion of the at least one image using a zoom out rendering technique.

10. The method of claim 9, wherein the zoom out rendering technique includes:
- replacing the first portion of the at least one image with a corresponding second portion of the at least one image, and
- repeatedly adding pixels at a border of the second portion of the at least one image.

11. The method of claim 9, wherein the zoom out rendering technique is processed without user interaction.

12. The method of claim 8, wherein selecting the first portion of the at least one image includes:
- determining if the resources associated with the encoding of the at least one image and communicating the webpage to the user device are between the first threshold and a second threshold;
- determining if the resources associated with the encoding of the at least one image and communicating the webpage to the user device are below the second threshold;
- upon determining the resources are between the first threshold and the second threshold, selecting a first portion of the at least one image based on a first criteria; and
- upon determining the resources are below the second threshold, selecting a second portion of the at least one image based on a second criteria.

13. A method comprising:
- determining if a first amount of computing resources available to encode at least one image is greater than a first threshold, the at least one image having a first area;
- determining if a second amount of computing resources available for communicating a webpage including the at least one image to a user device is greater than a second threshold;
- in response to determining both the first amount of computing resources is greater than the first threshold and the second amount of computing resources is greater than the second threshold,
  - encoding the at least one image, and
  - transmitting the webpage and the encoded at least one image; and
- in response to determining at least one of the first amount of computing resources is less than the first threshold and the second amount of computing resources is less than the second threshold, selecting a first portion of the at least one image based on a first criteria, the first portion of the at least one image having a second area that is smaller than the first area;
  - encoding the first portion of the at least one image, and
  - transmitting the webpage, the encoded first portion of the at least one image and an indication that the webpage includes the first portion of the at least one image to a user device.

14. The method of claim 13, the method further comprising:
- selecting a second portion of the at least one image based on a second criteria, the second portion of the at least one image having a third area that is larger than the second area;
- encoding the second portion of the at least one image; and
- transmitting the encoded second portion of the at least one image and an indication that the encoded second portion of the at least one image corresponds to the first portion of the at least one image to the user device.

15. The method of claim 13, further comprising:
- encoding the at least one image, and
- transmitting the encoded at least one image to the user device.

16. The method of claim 13, wherein selecting the first portion of the at least one image includes:
- selecting a region of the at least one image to include the first portion of the at least one image based on a bit size of a compressed image,
- the bit size being based on one of the first criteria and a second criteria,
- a bit size of a compressed image selected based on the second criteria is smaller than a bit size of a compressed image selected based on the first criteria.

17. The method of claim 13, wherein the first portion of the at least one image is selected from a background region of the at least one image.

18. The method of claim 13, wherein the first portion of the at least one image has a dimension based on a dimension of the at least one image.

19. The method of claim 13, wherein the first portion of the at least one image has a dimension based on a dimension of an element of the webpage.

20. The method of claim 13, wherein the second amount of computing resources are based on at least one of a bandwidth of a network over which the webpage will be communicated, a quality of service associated with the network and a quality of service associated with the user device.

\* \* \* \* \*